United States Patent [19]

Hanson et al.

[11] Patent Number: 4,981,072

[45] Date of Patent: Jan. 1, 1991

[54] EXTERIOR REAR VIEW MIRROR ASSEMBLY WITH VENTILATOR FOR EXTERIOR SIDE WINDOW

[75] Inventors: Robert L. Hanson, Auburn Hills, Mich.; Norman L. Hampshire, Union City, Ohio

[73] Assignee: Sheller-Globe Corporation, Detroit, Mich.

[21] Appl. No.: 494,989

[22] Filed: Mar. 16, 1990

[51] Int. Cl.⁵ ............................ B60H 1/24; B60S 1/54
[52] U.S. Cl. ...................................... 98/2.04; 98/2.18; 350/606
[58] Field of Search ........................... 98/2, 2.04, 2.18; 350/584, 606, 635

[56] References Cited

U.S. PATENT DOCUMENTS 3,859,899 1/1975 Mills ........................................... 98/2
4,898,458 2/1990 McDonald .......................... 250/584

FOREIGN PATENT DOCUMENTS 2017093 10/1971 Fed. Rep. of Germany ...... 350/584
44054 3/1980 Japan ..................................... 350/584
2058695 4/1981 United Kingdom ................ 350/584
2130990 6/1984 United Kingdom ................ 350/606

Primary Examiner—Harold Joyce
Attorney, Agent, or Firm—Barnes, Kisselle, Raisch, Choate, Whittemore & Hulbert

[57] ABSTRACT

An exterior rear view mirror assembly having a housing with a passage for directing a mixture of ambient air and conditioned air over the exterior surface of a side window of a vehicle. A mounting structure attached to the housing has a grille adjoining the interior of the vehicle and connected to a duct. Conditioned air is drawn from the vehicle interior through the grille to the duct which is in communication with the passage.

29 Claims, 8 Drawing Sheets

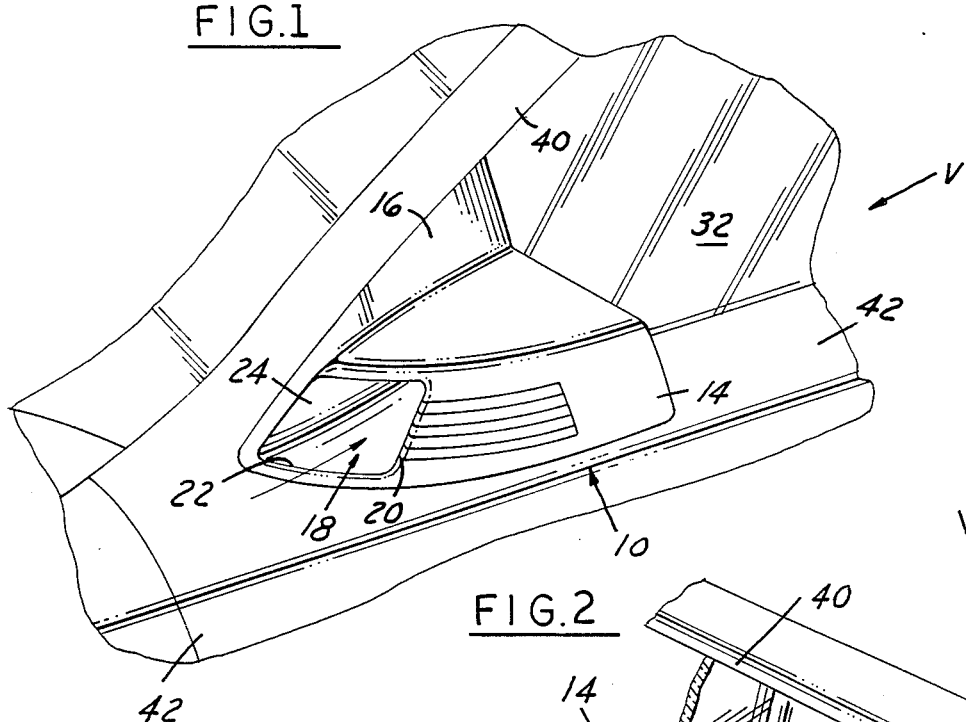
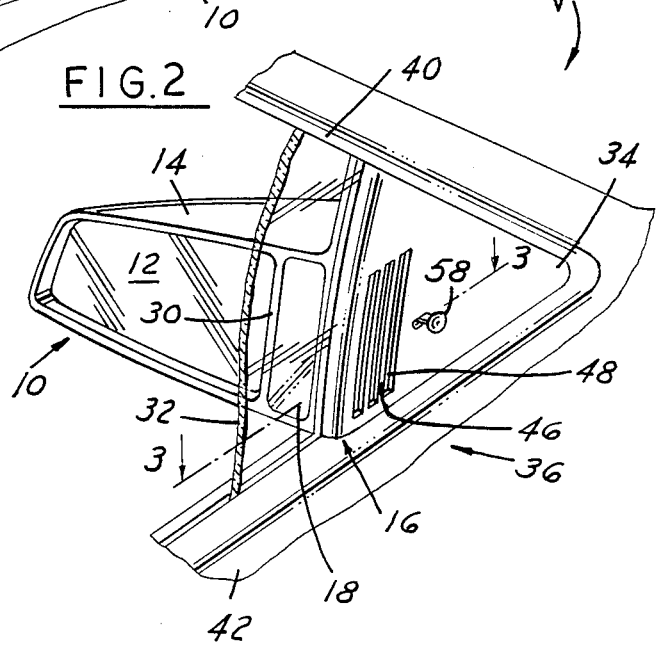
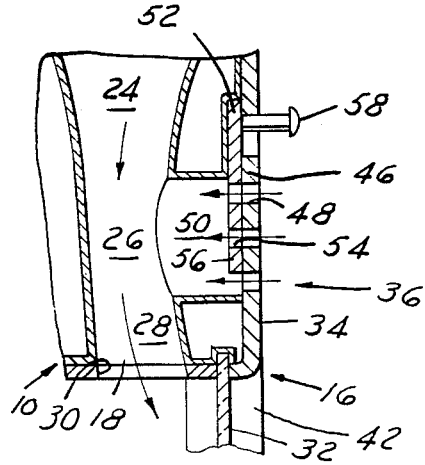

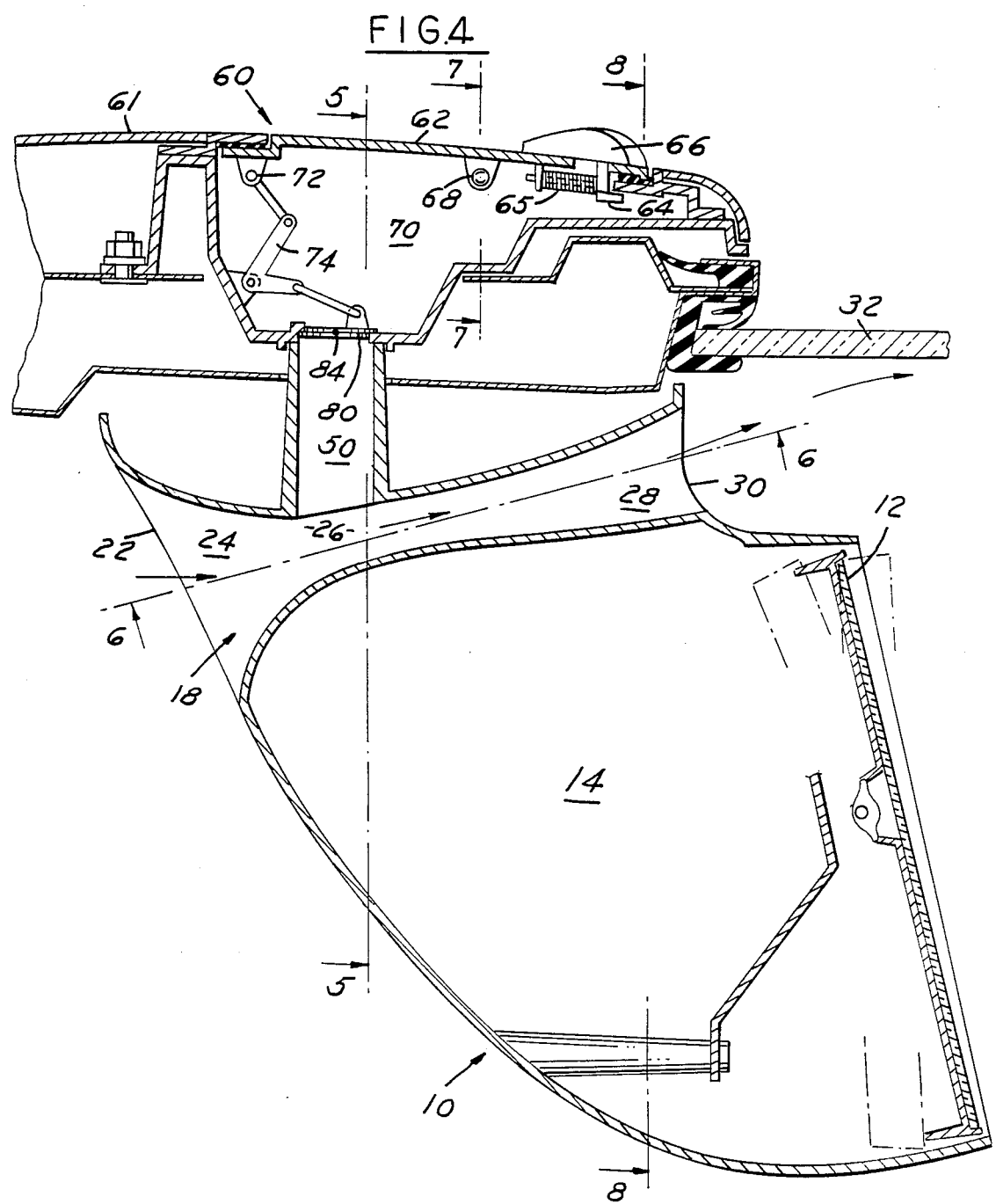

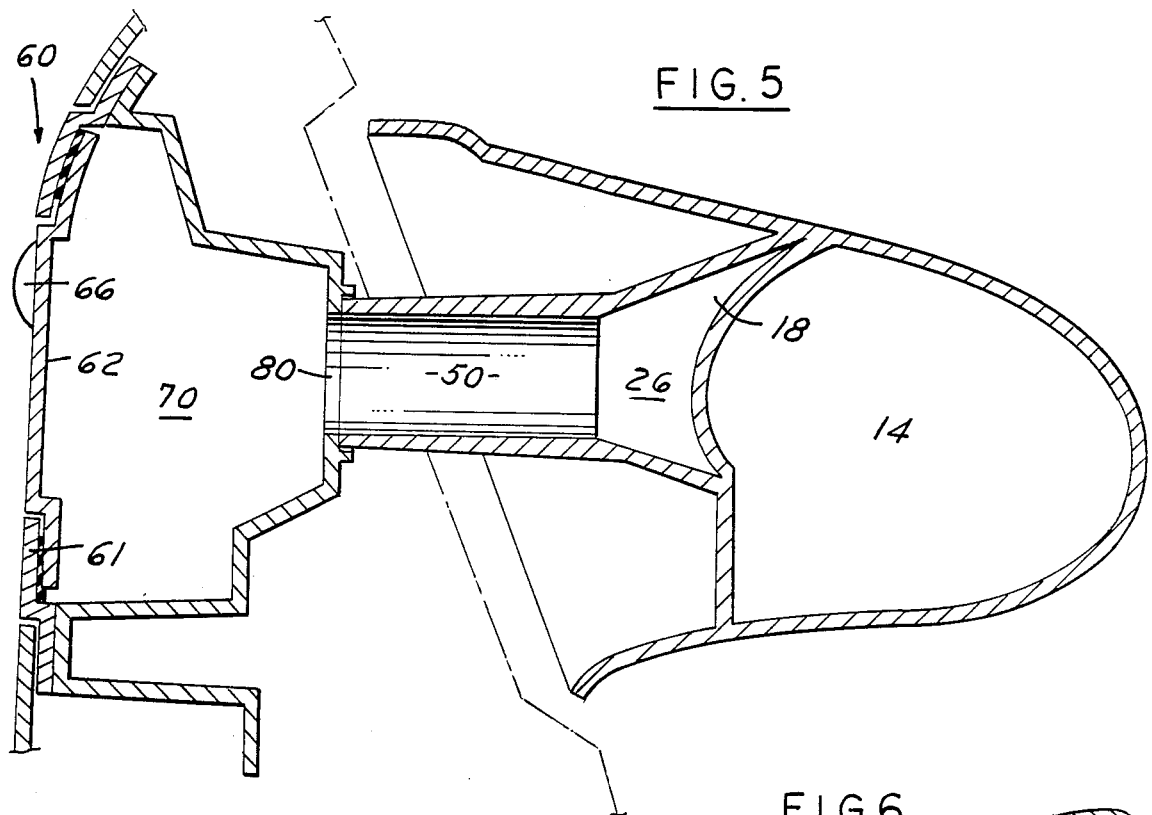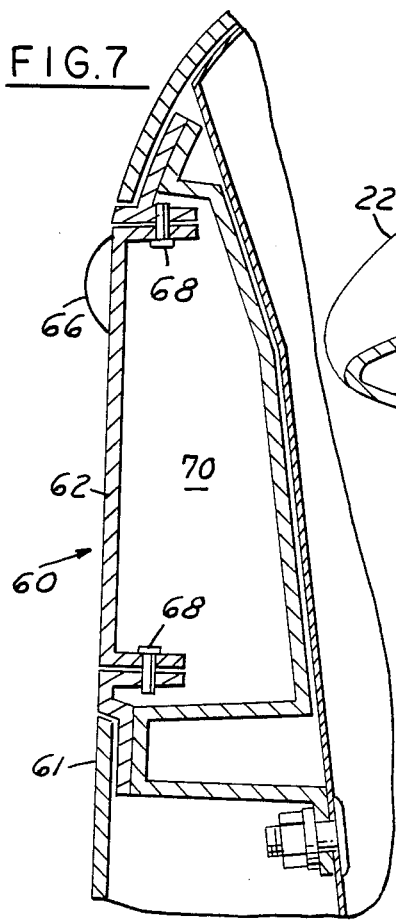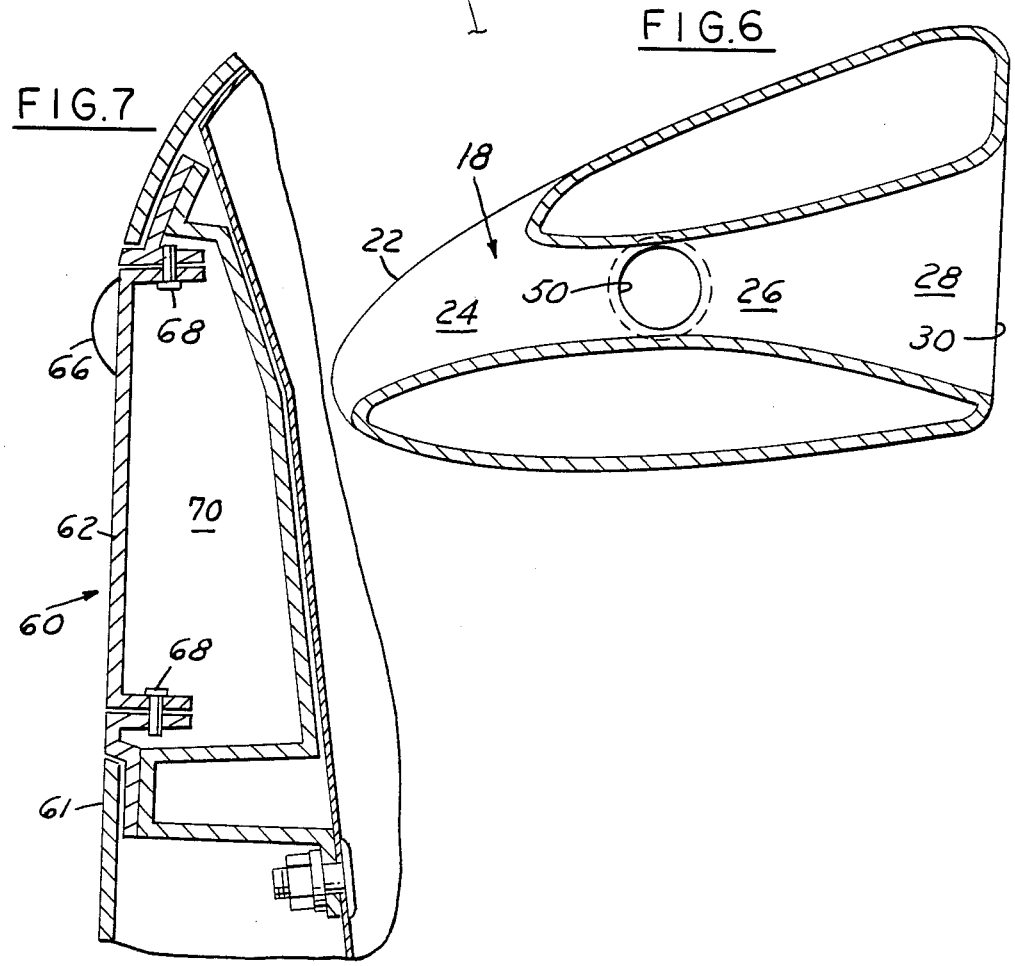

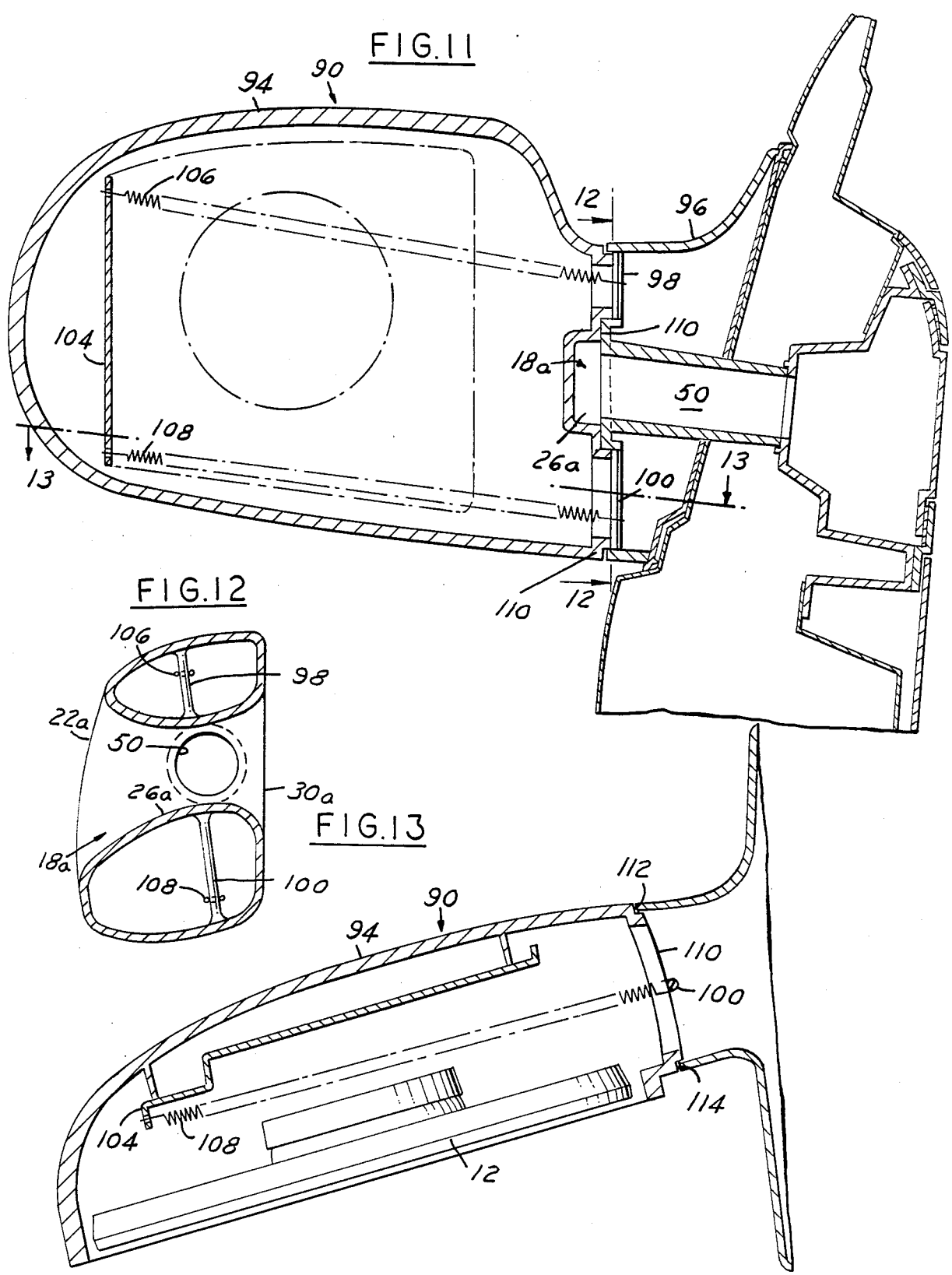

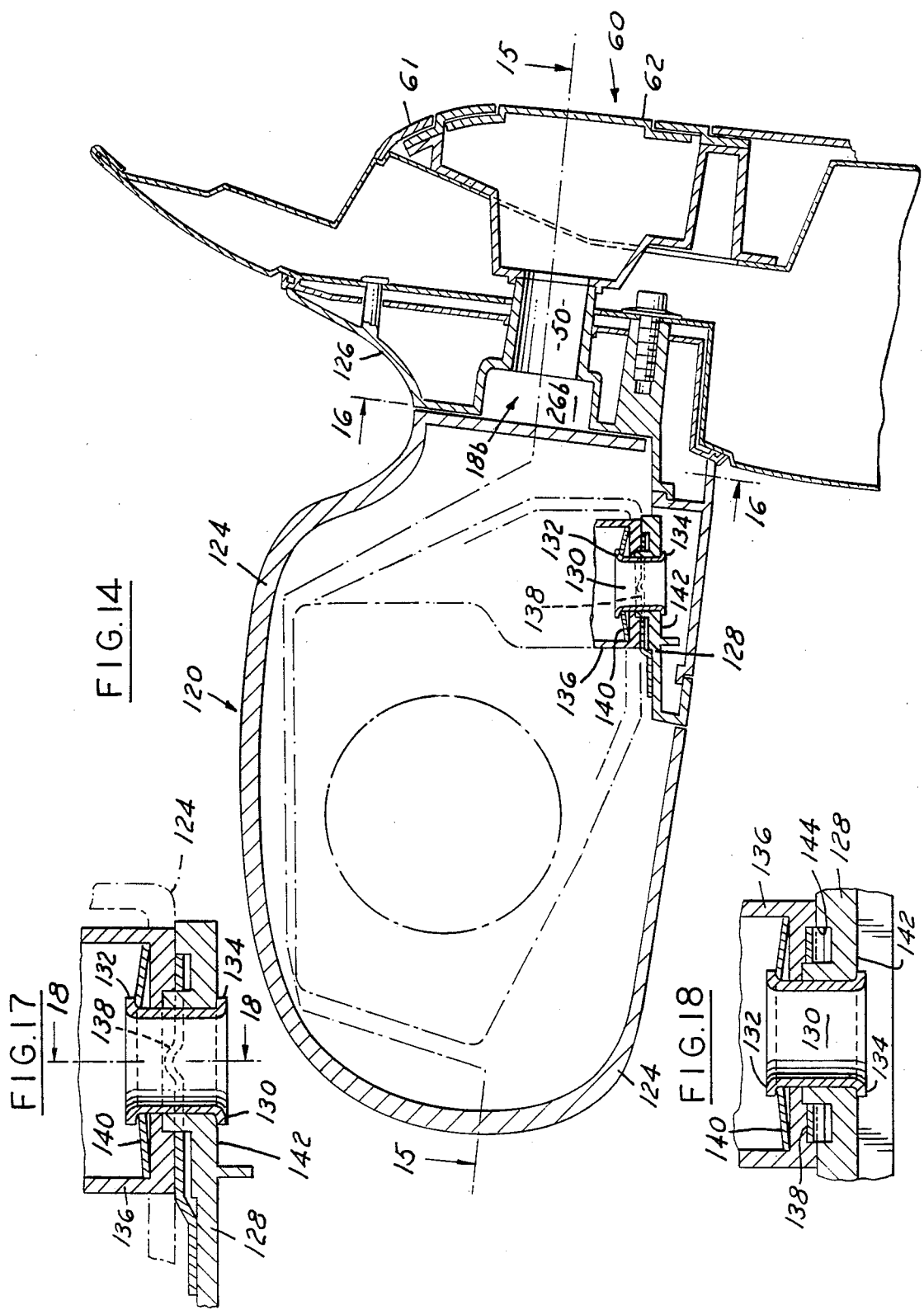

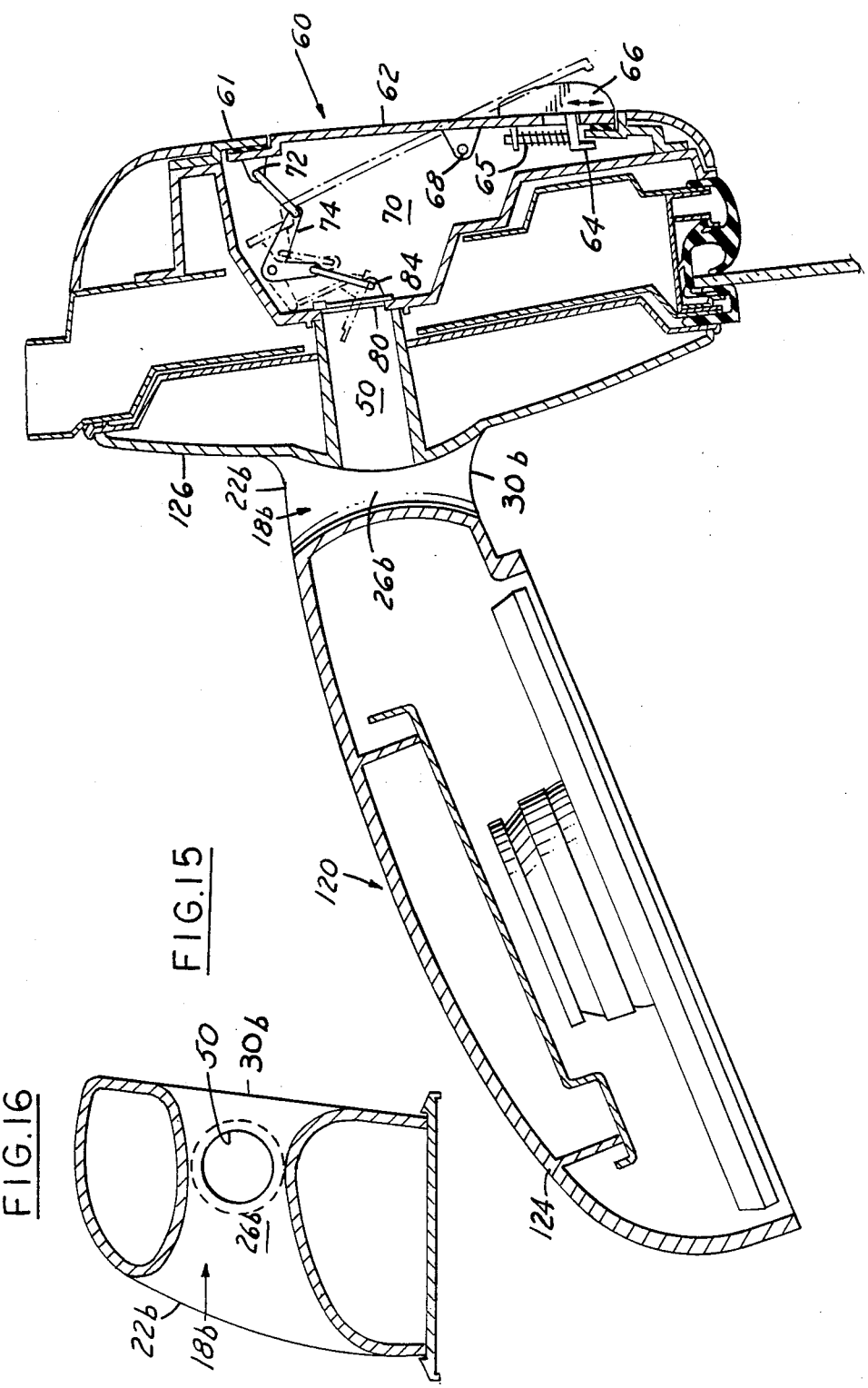

EXTERIOR REAR VIEW MIRROR ASSEMBLY WITH VENTILATOR FOR EXTERIOR SIDE WINDOW

This invention relates to an exterior rear view mirror assembly and particularly to a mirror assembly which provides conditioned ventilation to the exterior window of a motor vehicle.

BACKGROUND AND SUMMARY OF THE INVENTION

The accumulation of dirt and/or precipitation on the exterior of side windows of a motor vehicle is a common problem for operators of motor vehicles. This accumulation prevents and obstructs the operator's visibility to the periphery and more importantly, the ability to see in the exterior rear view mirror any traffic approaching in the adjoining lane.

The problem of impaired sight through a side window has been addressed by various patents. For example, the Mills U.S. Pat. No. 3,859,899 discloses a side mirror unit which draws air from the interior of the vehicle through a grille and out to the periphery of the mirror and to a vent directed to the exterior of the side window. It utilizes a "slip stream" of ambient air passing over the side mirror unit to draw the air out of the interior of the car, but this aspirating affect only provides a minimal air flow rate across the window which can not clear the window of dirt, debris and frozen precipitation. Gebhard U.S. Pat. No. 4,462,303 disclosed a sail mirror assembly which is connected to the vehicle's interior ventilation system and provides a door to the interior of the vehicle. This invention utilizes the reduced air pressure around the periphery of the mirror to draw the interior air of the vehicle through the door into the mirror housing, around the mirror assembly to the periphery of the mirror. This invention did not address the problems of dirt, debris and precipitation accumulating on the exterior of the side window and instead provided ventilated air over the interior of the side window. Also, the Gebhard invention is connected to the ventilation system which is more costly and generally ineffective because of the restrictions to the air flow by the bends of the ductwork leading to the mirror and side window.

Among the objectives of the invention are to provide (1) an exterior mirror assembly that clears and cleans debris and precipitation from a side window from which an operator may view out; (2) includes a passage which mixes conditioned interior air with ambient air to be directed to the exterior of a side window; (3) includes a conditioned interior air flow regulator; and (4) which is of simple and economical design, manufacture and assembly.

In accordance with the invention, an exterior rear view mirror assembly has a mirror element enclosed by a housing which is coupled to a mounting structure attached to the side of a vehicle. Interposed between the mirror housing and the mounting structure is a passage with an inlet facing towards the forward section of the vehicle and an outlet facing towards the exterior of a side window of the vehicle. The mounting structure has a duct which communicates with the interior of the vehicle and the passage. As the vehicle moves forward the ambient air flows through the passage and draws conditioned interior air through the mounting structure into the duct and mixes both air flows in the passage before exiting through the outlet against the exterior of the side window. The flow of interior air is controlled by the operator by adjusting a flow regulating system. An important advantage of this present invention is that the conditioned air flow across the exterior of the side window is of sufficient force and temperature to keep debris, dirt and precipitation from accumulating on the exterior of the window.

Other objects and features of the invention will be apparent from the following description and claims in which the invention is described together with details to enable persons skilled in the art to practice the invention, all in connection with the best mode presently contemplated for the invention.

DESCRIPTION OF THE DRAWINGS

FIG. 1 is an exterior perspective view of an exterior rear view mirror assembly embodying the invention.

FIG. 2 is an interior perspective view of an exemplary but preferred embodiment of the exterior rear view mirror assembly.

FIG. 3 is a sectional view taken along line 3—3 in FIG. 2.

FIG. 4 is a plan sectional view of an alternate embodiment of the invention.

FIG. 5 is a sectional view taken along the line 5—5 in FIG. 4.

FIG. 6 is a sectional view taken along the line 6—6 in FIG. 4.

FIG. 7 is a fragmentary sectional view taken along the line 7—7 in FIG. 4.

FIG. 11 is an elevational sectional view along line 11—11 in FIG. 10.

FIG. 12 is a fragmentary sectional view taken along line 12—12 in FIG. 11.

FIG. 13 is a fragmentary sectional view taken along line 13—13 in FIG. 11.

FIG. 14 is an elevational sectional view of another alternate embodiment of the invention.

FIG. 15 is a plan sectional view taken along line 15—15 in FIG. 14.

FIG. 16 is a sectional view taken along line 16—16 in FIG. 14.

FIG. 17 is an enlarged elevational sectional view of a pivot mechanism shown in FIG. 14.

FIG. 18 is an elevational sectional view taken along line 18—18 in FIG. 17.

DETAILED DESCRIPTION

Figure 8:
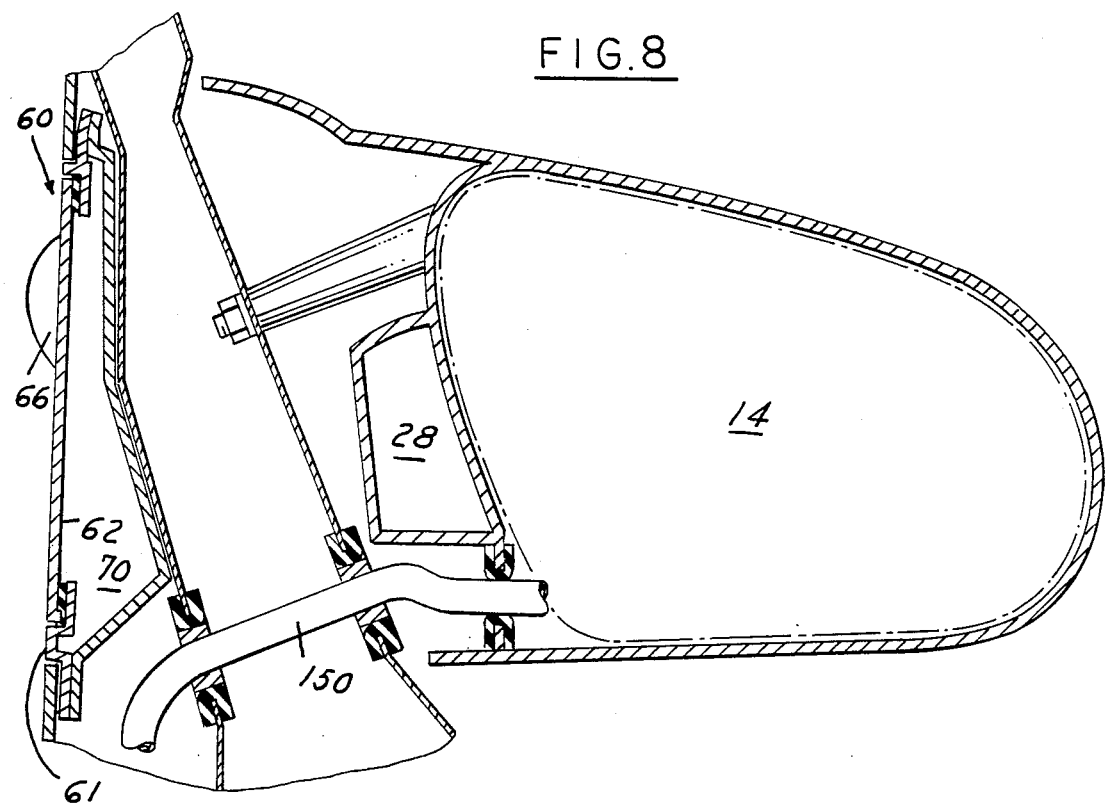
FIG. 8 is a fragmentary sectional view taken along the line 8—8 in FIG. 4.

The first embodiment of the present invention is illustrated in FIGS. 1-3. With specific reference to FIG. 2, a fixed position exterior rear view mirror assembly 10 includes a mirror 12 protectively covered by a housing 14 and a mounting structure 16 integral with housing 14. Juxtaposed to the mounting structure 16 and formed in the housing 14 is a ventilator passage 18.

As shown in FIG. 1, the mirror housing 14 preferably has its exterior forward portion 20 formed in the shape of an air foil for aerodynamic effects. This shape allows the air to flow over the entire mirror assembly 10. Preferably, the mirror assembly 10 is of smooth plastic construction.

The ventilator passage 18 has an inlet opening 22 that has a rectangular cross sectional shape which defines the entrance to an inlet portion 24 as shown in FIG. 1. FIG. 3 shows that inlet portion 24 narrows down to a venturi throat 26 which gradually opens up to an outlet portion 28 having an outlet opening 30, shown as a vertical slot that is directed towards the exterior of a side window 32 of a vehicle V. In this embodiment, slot outlet 30 has a face area less than the face area of inlet opening 22.

The mounting structure 16 as shown in FIG. 2 has a base plate 34 attached to the lower forward corner of a window frame 40 of a door 42 of the vehicle V. The base plate 34 is flush with the side window 32 and is of plastic construction.

In the first embodiment as shown in FIG. 3, the base plate 34 has an interior air flow regulating system 36 which includes a grille 46 with slot openings 48 that lead to a duct 50. The grille 46 is shown with three vertical slot openings 48. A shutter element 52 has openings 54 and slats 56 that are equivalent to the size of openings 48. This shutter element 52 has a handle 58 for the operator to slide to one extreme position to block off the openings 48 of the grille 46 with slats 56 or to an opposite extreme position to allow openings 48 full access to duct 50 or any other intermediate position.

A second embodiment shown in FIGS. 4–9 has the same exterior mirror configuration of the first embodiment. The housing 14 has a ventilator passage 18 formed therein and protectively covers mirror 12. Also, duct 50 is still in communication with the venturi throat 26 of ventilator passage 18 so that the air mixture still exits through outlet portion 28 and through outlet 30 (FIG. 6).

Figure 9:
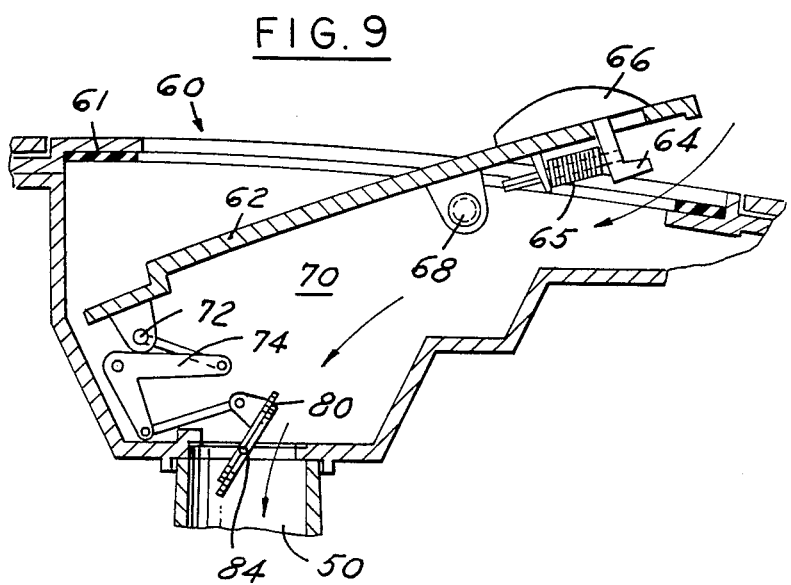
FIG. 9 is a fragmentary plan sectional view similar to FIG. 4 showing parts in a different operative position.

This second embodiment utilizes a modified interior air flow regulating system 60 which has a mounting structure 61, a vent door 62 with a spring latch 64 biased by spring 65 and a latch handle 66 attached to latch 64 to hold the vent door 62 in a closed position, as shown in FIG. 4. FIG. 7 shows vent door 62 pivoted to the mounting structure 61 by pins 68 enclosing a chamber 70 of mounting structure 61. A pivot pin 72 is mounted on an end of door 62 opposite latch 64 which connects door 62 to a linkage 74 which are ultimately attached to duct closure 80 pivoted on pin 84. As shown in FIG. 9, the conditioned interior air must pass through chamber 70 past duct closure 80 into duct 50 and into the venturi throat portion 26 of passage 18 to contact the exterior of side window 32.

FIGS. 10–14 illustrate a third embodiment of this invention, a break-away type rear view mirror assembly 90. This assembly 90 has a separate mirror housing 94 adjoining a mounting structure 96 attached to the side of the vehicle V. A ventilator passage 18a is formed between the adjoining walls of housing 94 and structure 96. Mounting structure 96 has on its one end extending from the vehicle V, passage 50 formed axially therein and a pair of integral posts 98, 100 in vertical alignment with each other and separated by passage 50.

The mirror housing 94 has a integral brace 104 on which two springs 106, 108 are attached. The springs 106, 108 extend from brace 104 and engage posts 98, 100 to hold end 110 of mirror housing 94 firmly against posts 98, 100.

In this third embodiment, mirror assembly 90 is capable of being dislocated from its original desired position to move either towards the forward portion of the vehicle V or the rear portion of the vehicle V by pivoting on mirror housing corners 112 or 114. After dislocation, the mirror housing 94 is returned to its original position by springs 106, 108.

FIGS. 14–19 illustrate a fourth embodiment of the invention, a fold-away type mirror assembly 120. This assembly 120 includes a mirror housing 124 and a mirror mounting structure 126 with a pivot extension 128 on its lower portion. A ventilator passage 18b is formed between adjoining walls of housing 124 and structure 126.

A circular pivot tube 130 having upper and lower flanges 132, 134, couples a mirror housing support 136 of mirror housing 124 to pivot extension 128 of structure 126. Interposed between the mirror housing support 136 and extension 128 is a detent spring 138. A spring washer 140 engages the top portion of mirror housing support 136 and the underside of upper flange 132 to move lower flange 134 to engage the bottom wall 142 of pivot extension 128. The spring washer 140 forces the detent of spring 138 into a cavity 144 of mirror housing support 136 and forces the pivot extension 128 to frictionally engage bottom of the detent spring 138. This rear view mirror assembly 120 has the capability of rotating the mirror housing 124 from its desired position about the axis of the pivot tube 130 to various detent cavities formed in the bottom housing support 136.

As shown in FIG. 12 and FIG. 16, the third and fourth embodiment of this invention have similar ventilator passages 18a, 18b. Each passage 18a, 18b has an inlet opening 22a, 22b having approximately the same face area as outlet opening 30a, 30b. These inlet and outlet face areas are much greater than the cross sectional area of venturi 26a, 26b and may approach a ratio of 4:1. As shown in FIG. 11 and FIG. 14, the mirror housing 94, 124 together with the mounting structure 96, 126 provide the walls of passage 18a, 18b. If either mirror assembly 90 or 120 is rotated from its original desired position, the configuration of passage 18a, 18b is altered such that the exterior side window 32 will not be properly ventilated by assembly 90 or 120.

Figure 10:
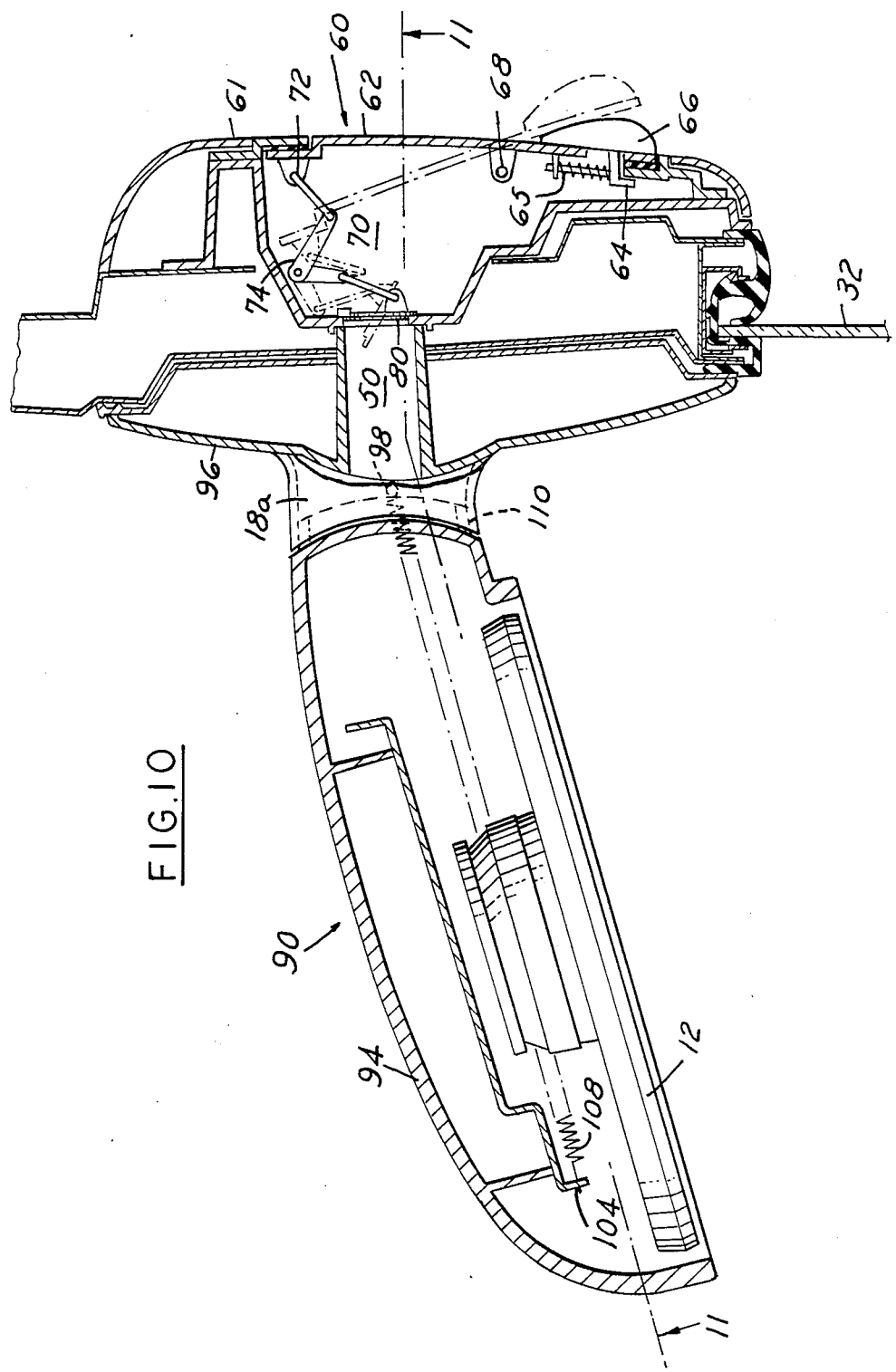
FIG. 10 is a plan sectional view of another alternate embodiment of the invention.

Both the third and fourth embodiments shown in FIG. 11 and FIG. 14 utilizes the identical modified interior air flow regulating system 60 of the second embodiment. This system provides conditioned interior air for mixing with ambient air. As shown in FIGS. 8, 10 and 15, a latch handle 66 is slidably moved so that the attached latch 64 compresses spring 65 and disengages from mounting structure 61 to open door 62. With specific reference to FIG. 9, the door 62 is rotated counterclockwise on pivots 68 so that chamber 70 is in communication with the interior of the vehicle V. Because of the mechanical linkages 74 interengagement with door 62, duct closure 80 is opened on its pivot pin 84 and thereby provides a path for the conditioned interior air to flow to the exterior of side window 32. In the vent open position, air from the interior of the vehicle V flows through the mounting structure chamber 70 and into the duct 50 which leads to the venturi throat 26 of the passage 18.

As represented in FIG. 8, the embodiments of this invention do not interfere with the remote control cable 150 for mirror 12 nor does it detract from the structural integrity of the exterior rear view mirror assembly 10.

In operation, all embodiments of this invention will keep the side window clean and clear when the vehicle V is moving forward. This movement allows ambient air to flow into inlet opening 22, 22a, 22b of the passage 18, 18a, 18b through the constriction of the venturi throat 26, 26a, 26b and out the outlet opening 30, 30a, 30b. As ambient air passes the venturi throat 26, 26a, 26b, the pressure of the ambient air drops and the velocity increases. This low pressure creates a suction into the interior of the vehicle V through the duct 50. In the first embodiment shown in FIG. 3, if the shutter element 52 is in an open position the suction created in the venturi throat 26 will draw conditioned interior air through the openings 48 of grille 46 into the duct 50 to mix with the ambient air passing through the passage 18.

In the second, third and fourth embodiments, the vent door 62 must be rotated to an open position so that the negative pressure in the venturi throat 26, 26a, 26b will create a suction through the duct 50, the mounting structure chamber 70 and the vent door 62 to draw conditioned interior air through the duct 50 to mix with the ambient air passing through venturi throat portion 26, 26a, 26b.

In all of the above embodiments, the conditioned interior air is mixed with the ambient air flow and forced through the outlet opening 30, 30a, 30b against the exterior of the side window 32. Optimally, the inlet and outlet areas of the ventilator passage 18a, 18b are approximately equal and approach four times the area of the center of the venturi Additionally, it is preferred that the outlet opening and inlet opening are equal distance from the center line of the venturi and have similar configurations, i.e. both openings (inlet and outlet) are square, rectangular or circular.

It can be seen that in accordance with the invention, the invention provides an exterior rear view mirror designed to clean and clear the side window of debris and precipitation. The mirror assembly utilizes a passage in communication with a duct to direct a mix of conditioned interior air and ambient air against the exterior of side window. Also the mirror assembly provides an interior air flow regulator to vary the mix of conditioned interior air striking against the exterior of side window. All embodiments of the mirror assembly are of simple design and require minimal cost and expense to manufacture and install.

We claim:

1. An exterior rear view mirror assembly for an enclosed vehicle comprising
   a mirror element;
   a housing for said mirror element;
   means for mounting said housing to a side of the enclosed vehicle;
   means formed between said housing and said mounting means, wherein said means is a passage interposed between said mirror element and said mounting means;
   said passage having an exterior inlet opening facing toward a forward section of said vehicle and an outlet opening facing towards an exterior surface of a side window of said vehicle; and
   said mounting means having a duct to communicate with said passage and with the interior of said enclosed vehicle.

2. The exterior rear view mirror assembly as set forth in claim 1 wherein said housing is integral to said mounting means.

3. The exterior rear view mirror assembly as set forth in claim 2 wherein said mounting means comprises:
   a base plate attached to the lower forward portion of a window frame of said vehicle; and
   means on said base plate for venting air from the interior of said vehicle to said duct.

4. The exterior rear view mirror assembly as set forth in claim 3 wherein said venting means includes:
   a grille with slot openings in said base plate; and
   a spaced vertical element having slats adjacent to said grille and movable to regulate air flow by selectively blocking said slots.

5. The exterior side view mirror assembly as set forth in claim 3 wherein said venting means comprises:
   a vent door;
   a spring loaded latch on said door pivoted on said base plate;
   a movable duct closure; and
   mechanical interlocking means between said vent door and duct closure.

6. The exterior rear view mirror assembly as set forth in claim 1 wherein said passage further comprises a venturi throat portion between said inlet opening and said outlet opening.

7. The exterior rear view mirror assembly as set forth in claim 6 wherein said duct is in communication with said venturi throat of said passage.

8. The exterior rear view mirror assembly as set forth in claim 7 wherein said inlet opening and said outlet opening have the same shape and dimensional area.

9. The exterior rear view mirror assembly as set forth in claim 8 wherein said outlet opening is oriented to direct air towards the exterior of the vehicle window.

10. The exterior rear view mirror assembly as set forth in claim 1 wherein said housing is detachably held against said mounting means by at least one spring.

11. The exterior rear view mirror assembly as set forth in claim 10 wherein said mounting means comprises a base plate attached to the lower forward portion of a window frame of said vehicle, means on said base plate for venting air from the interior of said vehicle to said duct and an integral post adjacent said duct for engagement with said spring.

12. The exterior rear view mirror assembly as set forth in claim 11 wherein said venting means comprises:
   a vent door;
   a spring loaded latch on said door pivoted on said base plate;
   movable duct closure; and
   mechanical interlocking means between said vent door and duct closure.

13. The exterior rear view mirror assembly as set forth in claim 12 wherein said passage further comprises a venturi throat portion between said inlet opening and said outlet opening.

14. The exterior rear view mirror assembly as set forth in claim 13 wherein said duct is in communication with said venturi throat of said passage.

15. The exterior rear view mirror assembly as set forth in claim 1 wherein said housing is rotatably secured to said mounting means.

16. The exterior rear view mirror assembly as set forth in claim 15 wherein said mounting means comprises:
   a base plate attached to the lower forward portion of a window frame of said vehicle;
   means on said base plate for venting air from the interior of said vehicle to said duct;
   a lower extension portion; and
   a pivot tube coupling said housing to said extension portion.

17. The exterior rear view mirror assembly as set forth in claim 16 wherein said venting means comprises:
a vent door;
a spring loaded latch on said door pivoted on said base plate;
a movable duct closure; and
mechanical interlocking means between said vent door and duct closure.

18. The exterior rear view mirror assembly as set forth in claim 17 wherein said passage further comprises a venturi throat portion between said inlet opening and said outlet opening.

19. The exterior rear view mirror assembly as set forth in claim 18 wherein said duct is in communication with said venturi throat of said passage.

20. The exterior rear view mirror assembly as set forth in claim 1 wherein said housing for said mirror has an air foil shape.

21. The exterior rear view mirror assembly as set forth in claim 20 wherein said housing is of a plastic construction.

22. A door for an enclosed vehicle comprising:
a body portion;
a window frame fixed to the top of said body portion;
a side window slidably mounted in said window frame;
an exterior rear view mirror assembly having a mirror element, a housing for said mirror element, means for mounting said housing to a lower forward corner of said window frame, said housing having a passage juxtaposed to both said mirror element and said mounting means, said passage having an exterior inlet opening facing towards a forward section of said vehicle and an outlet opening facing toward an exterior surface of said side window, and said mounting means having a duct to communicate with said passage and with the interior of said enclosed vehicle.

23. The door for an enclosed vehicle as set forth in claim 22 wherein said mounting means comprises:
a base plate attached to a lower forward portion of said window frame; and
a means on said base plate for venting air from the interior of said vehicle to said duct.

24. The door for an enclosed vehicle as set forth in claim 23 wherein said venting means comprises:
a grille with slot openings in said base plate; and
a spaced vertical element having slats adjacent to said grille and movable to regulate air flow by selectively blocking said slots 25. The door for an enclosed vehicle as set forth in claim 23 wherein said venting means comprises:
a vent door;
a spring loaded latch on said door pivoted on said base plate;
a movable duct closure; and
mechanical interlocking means between said vent door and said duct closure.

26. The door for an enclosed vehicle as set forth in claim 22 wherein said passage further comprises a venturi throat portion between said inlet opening and said outlet opening.

27. The door for an enclosed vehicle as set forth in claim 26 wherein said inlet opening and said outlet opening have the same shape and dimensional area.

28. The door for an enclosed vehicle as set forth in claim 26 wherein said outlet opening is oriented to direct air towards the exterior of said side window 29. The door for an enclosed vehicle as set forth in claim 26 wherein said duct is in communication with said venturi throat of said passage.

* * * * *